United States Patent [19]
Behrens

[11] Patent Number: 5,608,989
[45] Date of Patent: Mar. 11, 1997

[54] PLANT GROWTH SYSTEM FOR THE ENHANCEMENT OF THE ENVIRONMENT

[76] Inventor: Wolfgang Behrens, Trespenmoor 25, D-27243 Gross Ippener, Germany

[21] Appl. No.: 417,904

[22] Filed: Apr. 6, 1995

[30] Foreign Application Priority Data

Apr. 16, 1994 [DE] Germany ............ 44 13 260.3

[51] Int. Cl.⁶ .................................................. A01G 9/00
[52] U.S. Cl. .................................. 47/65.9; 47/1.01
[58] Field of Search ................... 47/66 S, 1 F, 9 R, 47/1.01

[56] References Cited

U.S. PATENT DOCUMENTS 7,280,885  5/1903  Dillon ...................... 47/66 S

FOREIGN PATENT DOCUMENTS

| 0475489 | 3/1992 | European Pat. Off. ........ 47/1 F |
| 3233016 | 8/1984 | Germany . |
| 3328110 | 2/1985 | Germany ................ 47/66 S |
| 4309979 | 9/1993 | Germany . |
| 5041924 | 2/1993 | Japan ...................... 47/1 F |
| 1771611 | 10/1992 | U.S.S.R. ................... 47/1 F |

*Primary Examiner*—Terry Lee Melius
*Assistant Examiner*—Joanne C. Downs
*Attorney, Agent, or Firm*—Burns, Doane, Swecker & Mathis

[57] ABSTRACT

The ability to effectively landscape an artificial surface that normally is incapable of supporting plant growth while simultaneously eliminating hazardous substances from the surrounding atmosphere in a simple and efficient manner is provided. A substrate having a thickness of at least 0.5 cm. is constructed that comprises an effective concentration of solid particles dispersed therein (e.g., activated carbon particles) that are capable of absorbing hazardous substances from the surrounding atmosphere. Also dispersed within the substrate is provided an effective concentration of living microorganisms that are capable of converting the hazardous substances when absorbed on the solid particles into non-hazardous substances that are capable of being utilized during the growth of plants that are rooted in the substrate.

8 Claims, 1 Drawing Sheet

PLANT GROWTH SYSTEM FOR THE ENHANCEMENT OF THE ENVIRONMENT

BACKGROUND OF THE INVENTION

In the past various substrates and systems have been proposed to support the growth of plants during the landscaping of surfaces that normally are incapable of supporting plant growth. The need for such landscaping commonly is presented in urban environments in order to improve the appearance of rooftops and other surfaces that otherwise would be devoid of vegetation. Accordingly, the presence of attractive plants is widely recognized to provide needed ornamentation and the desirability of roofscaping is achieving wider and wider acceptance with the passage of time. The presence of plants offers a welcome relief that imparts a natural feeling of well being to what would otherwise be a somewhat barren appearing man-made highly utilitarian environment.

Roofscapes are also known to reduce the undesirable reflection of sunlight from exposed surfaces, to help counteract extremes in temperature and the corresponding impact of such temperature changes upon a roof structure, to impart needed humidity to the atmosphere, and to provide a habitat for plants and small animals in an otherwise barren setting.

It is recognized that roofscapes commonly require periodic care with regular watering as well as other maintenance. It is preferred that such roofscapes be designed so that the care requirements are minimized and the vegetation present therein is as self-sufficient as possible.

Various layers or mats to support plant growth have been proposed for use in roofscapes in the past.

German Patent No. DE 32 33 016 C2 provides for roofscaping based on a vegetation substrate containing lava, sand, and ground clay, plus any other additives if required, such as peat, limestone, and basalt. Vegetation substrates of this type are relatively structurally stable and can be provided in relatively low thicknesses. The latter is of importance in order not to cause excessive static loading of roof areas.

In addition to the positive effects of roofscaping, such landscaping efforts in the past have not addressed the general problem of hazardous substances that are present in the surrounding atmosphere. Alarming concentrations of hazardous substances often are encountered in the ambient atmosphere of urban areas. This is of particular importance in areas in which substantial vehicle exhaust is generated on a daily basis. Despite the requirement that vehicles be equipped with catalytic converters, the atmosphere often is contaminated by hydrocarbons, benzene, NOx, soot, etc. Repeatedly, smog alarms are operative in a number of cities due to excessive quantities of hazardous substances in the atmosphere. Industrial areas, such as those in close proximity to refineries frequently encounter hazardous atmospheric conditions. In spite of air-quality regulations, frequently more could be done to eliminate hazardous materials from the surrounding atmosphere. Furthermore, air filter systems presently in use tend to be elaborate and expensive.

The present invention is based on a basic new concept of expanding the positive effects of roofscapes and linking them with a simple and effective mode for the elimination of hazardous substances from the surrounding atmosphere.

German Patent No. DE 43 09 979 A1 describes a means for cleaning and humidifying air, in particular ambient air, by the roots of specific plants and/or micro-organisms included in the equipment there proposed. This system consists of an electric fan, a plant container open at the top and a suitable filler, with the air to be cleaned and humidified being drawn inside the plant container and passed to the interior of the container. The plant container is arranged within a shell, with the interior of the plant container including an air distributor to disperse the air that is drawn by the fan. Furthermore, the shell consists of an operating unit which can be removed from the shell, in which are arranged a fan, an electronic control for the day/night operation, and a control for water level indication. The interior of the plant container consists of a bottom section containing a coarse-grained porous material extending up to the top edge of the fan distributor, and above that a layer of activated carbon, lava stone, and water-retaining clay pellets to accommodate the root ball of the plant. The function of the filler is not described in detail.

Overall, the prior art techniques for cleaning and humidifying air, in particular ambient air, are designed in such a way that the use of a separate filter can be eliminated, and adequate cleaning and venting will take place without the humidity of discharged air exceeding a specific maximum. While the prior art techniques were mainly used for the cleaning and humidification of air in enclosed areas, they have required a plant container, equipment such as an electronic control, a water level indicator, and an air distributor during use, and such techniques cannot be used for the purpose of the simple elimination of hazardous substances from the surrounding atmosphere in general. For instance, techniques are not feasible from a financial standpoint for dealing with hazardous materials that are present outdoors in the surrounding atmosphere where the quantity of such atmosphere is enormous.

SUMMARY OF THE INVENTION

It has been found that an improved substrate for supporting plant growth during the landscaping of an artificial surface that normally is incapable of supporting plant growth is a substrate having a minimum thickness of approximately 0.5 cm. comprising an effective concentration of solid particles dispersed therein that are capable of absorbing hazardous substances from the surrounding atmosphere, and an effective concentration of living microorganisms dispersed therein that are capable of converting said hazardous substances when absorbed on the solid particles into non-hazardous substances that are capable of being utilized during the growth of plants that are rooted in said substrate.

It further has been found that a system to support plant growth during the landscaping of an artificial surface that normally is incapable of supporting plant growth consists essentially of (a) a drainage and venting layer, (b) a separation layer located on top of the drainage and venting layer, and (c) a substrate layer having a minimum thickness of 0.5 cm. located on top of the separation layer comprising an effective concentration of solid particles dispersed therein that are capable of absorbing hazardous substances from the surrounding atmosphere, and an effective concentration of living microorganisms dispersed therein that are capable of converting hazardous substances into non-hazardous substances that are capable of being utilized during the growth of plants that are rooted in the substrate.

BRIEF DESCRIPTION OF THE DRAWING

The drawing illustrates a representative cross-sectional view of a system in accordance with the present invention for the support of plant growth during the landscaping of an artificial surface that normally is incapable of supporting plant growth.

DESCRIPTION OF PREFERRED EMBODIMENTS

Figure 1:
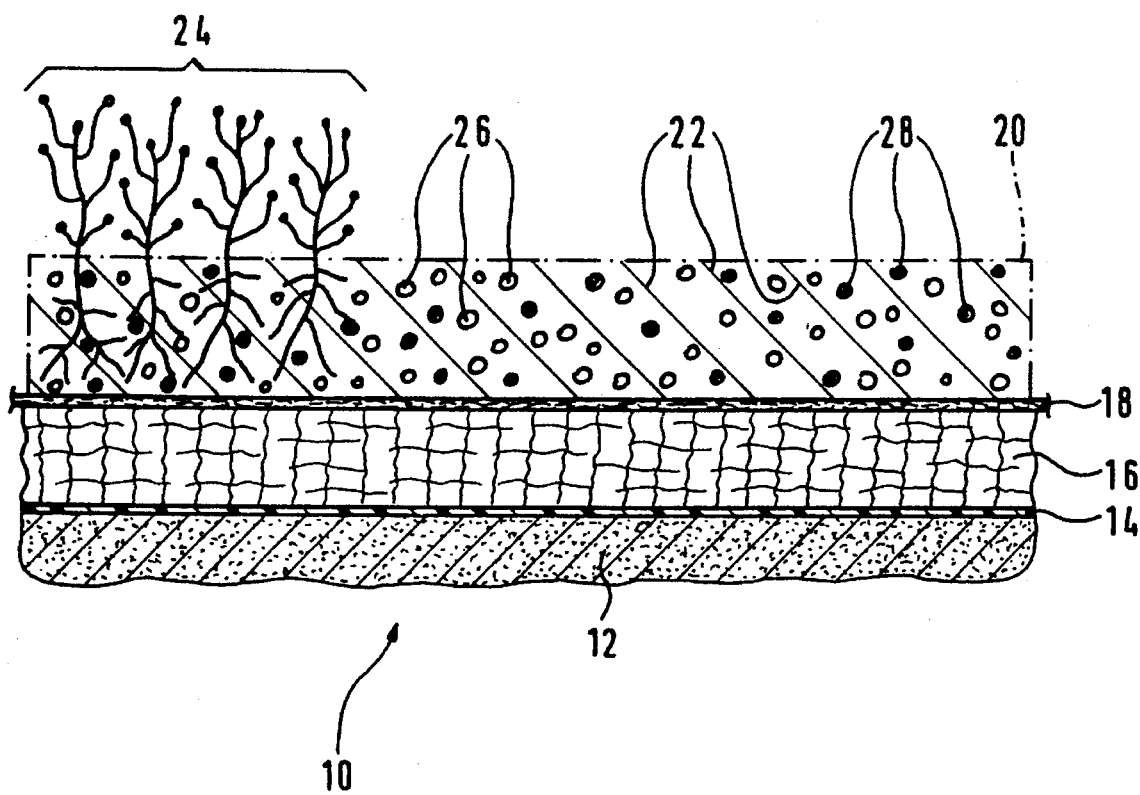

The present invention provides the ability to effectively landscape an artificial surface that normally is incapable of supporting plant growth while simultaneously eliminating hazardous substances from the surrounding atmosphere in a simple and efficient manner.

The substrate for supporting plant growth in accordance with the present invention has a minimum thickness of 0.5 cm. (e.g., approximately 0.5 to 2.0 cm.), and preferably has a minimum thickness of 1 cm. e.g., approximately 1 to 2 cm.). However, if desired, greater thicknesses can be provided. Thinner substrates generally have been found to be ineffective for supporting the required plant growth.

An essential component dispersed within the substrate for supporting plant growth is an effective concentration of solid particles capable of absorbing hazardous substances from the surrounding atmosphere and an effective concentration of live microorganisms capable of converting hazardous substances when absorbed on the solid particles to non-hazardous or less hazardous substances that are capable of being used or consumed during the growth of plants that are rooted in the substrate.

The solid particulate materials that are included within the substrate are capable of absorbing molecules of hazardous substances present in the surrounding atmosphere as the molecules contact the solid particles as the substrate is disposed on an artificial surface, such as a roof. The preferred solid particulate substances for this function are carbon-based (i.e., they are primarily carbon in their chemical composition). A particularly preferred carbon-based particulate solid substance is activated carbon. Such activated carbon commonly presents a very large surface area to the surrounding atmosphere and can be prepared by the carbonization of wood, peat, etc., under appropriate conditions known in the art. Alternatively, such solid particles can be charcoal, lignite, etc.

Representative hazardous substances that are capable of being removed from the atmosphere upon contact with such solid particles dispersed within the substrate are aromatic hydrocarbons, such as polycyclic aromatic hydrocarbons, polychlorinated biphenyls, etc. Harmful ozone also can be absorbed by such solid particles.

It is recommended that such solid particles be present at least in part on or near the surface of the substrate that is exposed to the atmosphere so that an opportunity for good contact with the atmosphere is provided. However, so long as the total thickness of the substrate if relatively thin as previously indicated, such particles can be dispersed substantially throughout the substrate.

In a preferred embodiment, the substrate has a thickness of approximately 2 cm. and the substrate includes at least 4 kg. of said solid particles that are dispersed or blended therein at a rate of at least 4 kg. per cubic meter.

Also, in a preferred embodiment of the present invention a catalytic material that is capable of promoting the oxidation of hazardous substances is provided in association with the solid particles that are capable of absorbing the hazardous substances from the surrounding atmosphere. For instance, the solid particles simply can be impregnated or sprayed with such catalytic material prior to incorporation in the substrate of the present invention. Activated carbon has the ability to catalytically accelerate the oxidation of organic and inorganic compounds even without the supply of an additional catalytic substance. Also, a substance such as potassium iodide can be included in order to serve as a further promoter for the oxidative degradation reaction of the hazardous substances.

Microorganisms are selected for use in the present invention that possess the ability to convert the hazardous substances from the atmosphere to non-hazardous substances. A large number of microorganisms are known and available for accomplishing this function. Such microorganisms can be selected from among the aerobic bacteria that require oxygen to live. When included in such substrate in the presence of water and oxygen such microorganisms can accomplish the degradation and chemical modification of the hazardous materials that are presented by the atmosphere. Under such circumstances the microorganisms that are provided by man within the substrate are able to thrive and to reproduce. As will be apparent to those skilled in the art, microorganisms can be selected that are known to be capable of attacking and degrading specific hazardous substances commonly occur in the atmosphere at a specific location. In a preferred embodiment of the present invention the microorganisms are attached to the solid particles that are capable of absorbing hazardous substances from the surrounding atmosphere through impregnation of other intimate admixture. Particles of activated carbon that inherently exhibit a high surface area can well serve as a carrier for nutrients for the microorganisms.

The substrate for supporting plant growth in addition to the essential components previously identified can include those components commonly found in vegetative substrates. In addition to conventional soil components, one may include hydroscopic materials such as mineral wool, glass fibers, rock wool, etc., that are capable of holding moisture so as to minimize the frequency at which water must be applied in the absence of natural rainfall. Plant nutrients and minerals may be included. The components of the substrate can constitute components that are capable of being sprayed to form the desired layer. Also, it may consist of a dry biomass containing seeds and the area dry coated as described in German Patent No. DE 40 04 284 C1.

Plants are grown in the substrate of the present invention that are capable of utilizing during their metabolism non-hazardous substances derived from the breakdown of the hazardous substances from the atmosphere via microbial conversion. Accordingly, an attractive landscape is provided at an area that normally is incapable of supporting plant growth and all simultaneously benefit as described herein from the removal of hazardous materials from the atmosphere. Accordingly, the present invention serves to reduce the presence of hazardous materials that otherwise would be present in atmosphere particularly in urban areas. The plants being grown in the substrate benefit and serve to improve the overall appearance of the area to the benefit of mankind. A periodic labor-intensive physical removal of hazardous materials by man from the substrate is not required.

The requisite effective concentrations of solid particles that are capable of absorbing hazardous substances from the surrounding atmosphere and living organisms capable of the conversion by the hazardous substances to non-hazardous forms useful in the metabolism of higher multicellular plants are provided by man in the substrate from the beginning. Further maintenance by man is minimal with the exception of the need to renew the moisture content for plant growth during periods when natural rainfall is deficient. Also, supplemental concentrations of certain nutrients not otherwise provided may be required from time to time based upon the conditions encountered during use.

The present invention provides an efficient means to accomplish a reduction in the concentration of hazardous substances in the atmosphere. Attractive roofscaping further can be provided in commercial and industrial areas where the loading of the atmosphere with hazardous substances is a concern. Alternatively, the concept of the present invention can be utilized in conjunction with refuse sites. For instance, an effort can be made to seal such sites with foil or other vapor barrier and the surface above the barrier can be landscaped in accordance with the present invention so that hazardous substances that emanate from the refuse site are rendered non-hazardous. Additionally, areas adjacent sales facilities for gasoline can be landscaped to facilitate the removal of hazardous vapors in accordance with the present invention. For instance, ivy conveniently can be grown in the substrate for supporting plant growth in accordance with the present invention. Microorganisms are selected that are well suited for attacking hazardous substances found in the atmosphere at a particular location, and plants are selected for growing in the substrate that are capable of using the non-hazardous by-products.

In accordance with a preferred embodiment of the present invention the substrate heretofore discussed is provided as an essential component of a system to support plant growth during the landscaping of an artificial surface that normally is incapable of supporting plant growth. A representative embodiment of such system is illustrated in FIG. 1. Such system can be used to particular advantage when placed upon the roof of an urban structure at a location where hazardous substances are known to be a problem in the surrounding atmosphere.

The system for the support of plant growth consists essentially of (a) a drainage or venting layer 16, (b) a separation layer 18 located on top of the drainage and venting area, and (c) a substrate 20 for supporting plant growth. The system is positioned on roof 12 with seal 14 being disposed immediately on top of the roof.

The drainage or venting layer 16 is composed of a mat or other substance through which moisture and air readily can pass. This prevents the substrate from becoming overly saturated with water and thereby encourages plant growth while facilitating the passage of air together with any hazardous materials contained therein through the entire thickness of the substrate layer wherein plant growth takes place.

The separation layer 18 is designed to substantially prevent particulate materials present in the substrate for supporting plant growth from passing into the drainage and venting layer 16 which must remain substantially free of such particles if it is to satisfactorily perform its intended function. The separation layer 18 preferably is a conventional nonwoven fibrous material, such as a spun-bonded fibrous material, of a thermoplastic polymeric material such as polyethylene, polypropylene, polyethylene terephthalate, etc.

The substrate for supporting plant growth 20 has a minimum thickness of approximately 5 cm. In a preferred embodiment the substrate includes particles of activated carbon 26 that are capable of absorbing hazardous materials from the surrounding atmosphere, and microorganisms 28 that are capable of converting absorbed hazardous substances from the surrounding atmosphere that are present in the substrate into non-hazardous substances that are capable of being utilized during the growth of multicellular plants 24 that are rooted in the substrate. The remainder of the substrate in which the activated carbon particles 26 and the microorganisms 28 are dispersed is designated by hatching at 22. The activated carbon particles 26 and microorganisms 28 are dispersed throughout substrate 20. It is possible for plants 24 to be grown from the germination of seeds that are initially present in the substrate. Such substrate can be applied to separation layer 18 as a preformed mat. The substrate 20 preferably contains the activated carbon particles in a concentration of at least 4 kg. per cubic meter of such substrate.

The illustrated embodiment is structurally stable and facilitates the formation of a low-maintenance roofscape that simultaneously serves to enhance the quality of atmosphere of the surrounding environment.

The living microorganisms 28 typically become active and thrive in the presence of water. When hazardous substances from the atmosphere are absorbed upon the solid activated carbon particles they are converted through the action of the microorganisms into non-hazardous substances that are utilized during the growth of plants 24 that are rooted in substrate 20.

Although the invention has been described with a preferred embodiment, it is to be understood that variations and modifications may be resorted to as will be apparent to those skilled in the art. Such variations and modifications are to be considered within the purview and scope of the claims appended hereto.

I claim:

1. A system to support plant growth during the landscaping of an artificial surface that normally is incapable of supporting plant growth consisting essentially of (a) a drainage and venting layer, (b) a separation layer located on top of said drainage and venting layer, and (c) a substrate layer having a minimum thickness of 0.5 cm. located on top of said separation layer comprising an effective concentration of solid particles of activated carbon dispersed therein that are capable of absorbing hazardous substances from the surrounding atmosphere, and an effective concentration of living microorganisms dispersed therein that are capable of converting said hazardous substances into non-hazardous substances that are capable of being utilized during the growth of plants that are rooted in said substrate layer.

2. A system to support plant growth according to claim 1 wherein said substrate layer (c) has a thickness of approximately 0.5 to 2 cm.

3. A system to support plant growth according to claim 1 wherein said substrate layer (c) has a thickness of approximately 2 cm.

4. A system to support plant growth according to claim 1 wherein said solid particles of activated carbon of said substrate layer (c) are provided in association with a catalytic material that is capable of expediting oxidation of said hazardous substances.

5. A system to support plant growth according to claim 1 wherein said microorganisms of said substrate layer (c) are attached to said solid particles of activated carbon that are capable of absorbing hazardous substances from the surrounding atmosphere.

6. A system to support plant growth according to claim 1 wherein said microorganisms of said substrate layer (c) are capable of converting hazardous polycyclic aromatic hydrocarbons to substances that are capable of being utilized during the growth of plants that are rooted in said substrate layer.

7. A system to support plant growth according to claim 1 wherein said microorganisms of said substrate layer (c) are capable of converting hazardous polychlorinated biphenyls to substances that are capable of being utilized during the growth of plants that are rooted in said substrate layer.

8. A system to support plant growth according to claim 1 wherein said substrate layer (c) has a thickness of approximately 2 cm. and said substrate layer includes at least 4 kg. of said solid particles of activated carbon per cubic meter.

* * * * *